US 11,805,395 B1

(12) United States Patent
Wright et al.

(10) Patent No.: US 11,805,395 B1
(45) Date of Patent: Oct. 31, 2023

(54) MESSAGE ROUTING SYSTEM FOR CELLULAR TO SATELLITE NETWORKS

(71) Applicant: Syniverse Technologies, LLC, Tampa, FL (US)

(72) Inventors: Chris Wright, Plant City, FL (US); Sreenivasa Ganji, Tampa, FL (US); Daniel Acosta, Brandon, FL (US)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 18/213,640

(22) Filed: Jun. 23, 2023

Related U.S. Application Data

(60) Provisional application No. 63/388,073, filed on Jul. 11, 2022.

(51) Int. Cl.
*H04W 4/14* (2009.01)
*H04W 8/12* (2009.01)

(52) U.S. Cl.
CPC .............. *H04W 4/14* (2013.01); *H04W 8/12* (2013.01)

(58) Field of Classification Search
CPC ................................. H04W 4/14; H04W 8/12
USPC ......................................................... 455/466
See application file for complete search history.

(56) References Cited

U.S. PATENT DOCUMENTS

| | | | |
|---|---|---|---|
| 6,223,045 B1* | 4/2001 | Valentine | H04W 4/14 455/433 |
| 6,542,716 B1* | 4/2003 | Dent | H04B 7/1855 455/12.1 |
| 6,975,582 B1* | 12/2005 | Karabinis | H04B 7/18563 370/347 |
| 2002/0006792 A1* | 1/2002 | Usher | H04W 84/02 455/566 |
| 2016/0381657 A1* | 12/2016 | Blanchard | H04W 64/006 455/427 |
| 2021/0368305 A1* | 11/2021 | Kodaypak | H04W 4/14 |
| 2022/0240084 A1* | 7/2022 | Speidel | H04W 8/04 |

* cited by examiner

*Primary Examiner* — William Nealon
(74) *Attorney, Agent, or Firm* — Anton J. Hopen; Smith & Hopen, P.A.

(57) ABSTRACT

A system and method for delivering and receiving Short Message Service (SMS) messages between users connected to satellite and cellular networks. The system includes a communication device capable of operating in both satellite and cellular modes, a satellite service provider, a satellite proxy network, and a cellular operator. The method involves monitoring the network mode of the user device, relaying information about the user device's connection to the satellite network via a specially formatted SMS payload and registering the user device with a cellular operator when in satellite mode. The satellite proxy network serves as an anchoring point for sending and receiving SMS messages, ensuring seamless message exchange between satellite network users and cellular network users. The user device is designed to automatically switch between satellite and cellular modes based on network availability, ensuring continuous communication. This invention enables improved messaging services and enhances communication between users on different networks.

20 Claims, 7 Drawing Sheets

Satellite Messaging

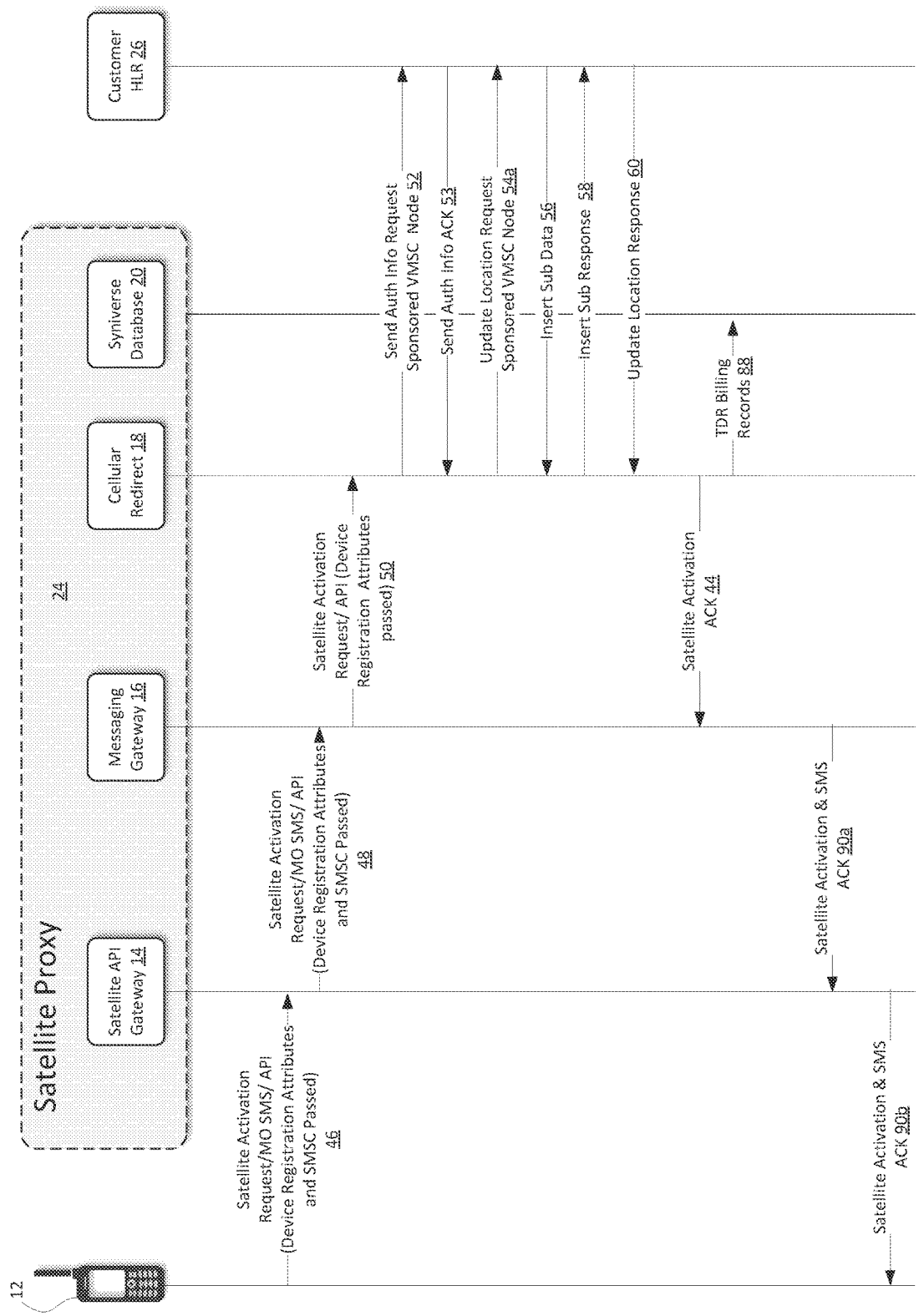

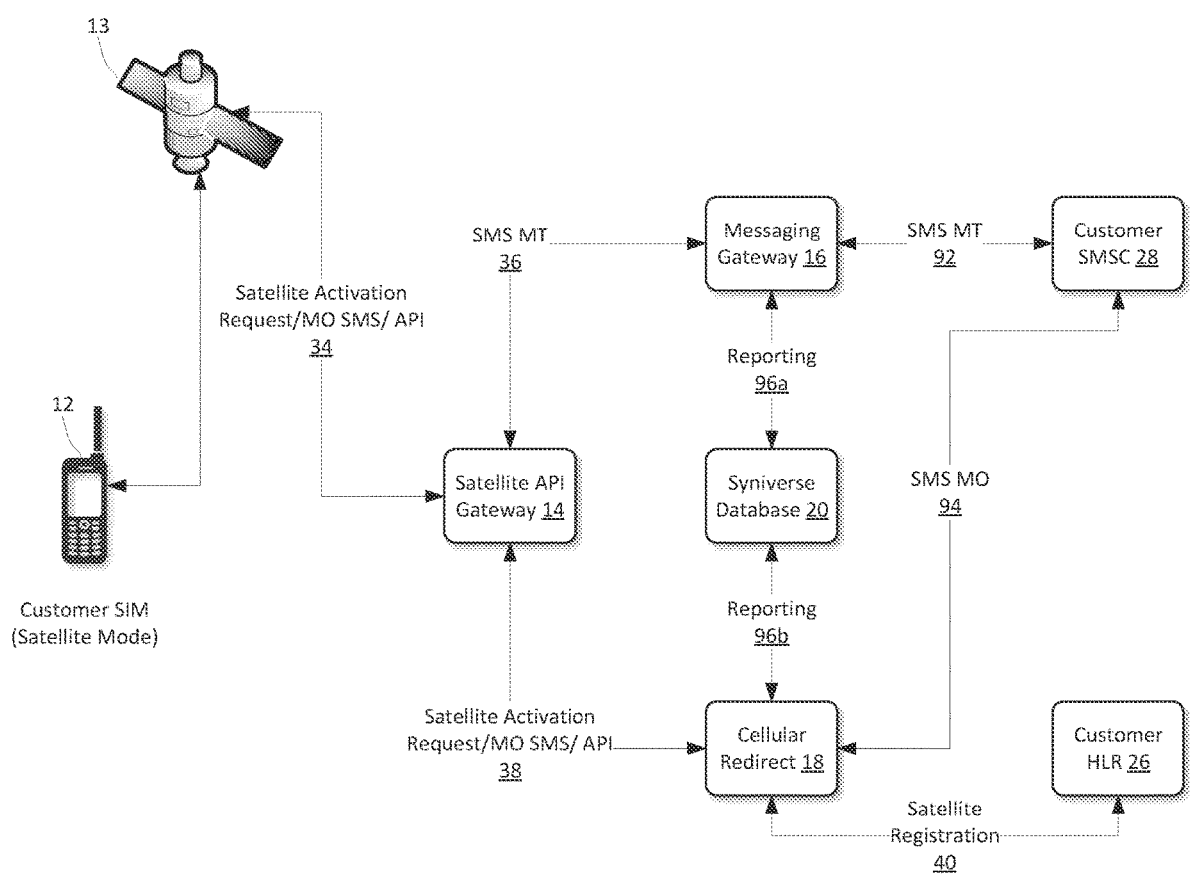

MESSAGE ROUTING SYSTEM FOR CELLULAR TO SATELLITE NETWORKS

PRIORITY CLAIM

This application claims priority to U.S. Provisional Patent No. 63/388,073 filed Jul. 11, 2022, entitled "Message Routing System for Cellular to Satellite Networks."

BACKGROUND OF THE INVENTION

FIELD OF THE INVENTION

This invention relates generally to the field of multi-band network service interoperability. More specifically, the invention pertains to a system to route message replies on a cellular network back to a different network platform such as a satellite-based sender.

BRIEF DESCRIPTION OF THE RELATED ART

Satellite-based communications services are typically used in remote areas or situations where traditional cellular networks are unavailable or unreliable. Three well-known providers of satellite phone service are known under the brands IRIDIUM, GLOBALSTAR, and INMARSAT. Phones that can operate in both satellite and cellular modes are known as hybrid or dual-mode satellite phones. They are designed to seamlessly switch between satellite and cellular networks, providing users with more extensive coverage and ensuring continuous connectivity. The phone will use the cellular network when it is available and switch to the satellite network when cellular coverage is poor or non-existent. However, a device in satellite mode (i.e., connected to a satellite service) can transmit messages to a cellular-based recipient, it will not receive message replies sent from the cellular network of the recipient. Thus, there exists an unresolved need for a method to redirect messaging services between satellite networks and cellular networks.

SUMMARY OF THE INVENTION

The present invention pertains to a method and system for facilitating messaging services between cellular and satellite networks, which is performed and implemented by a satellite proxy network. This is accomplished through the network's reception of a special Short Message Service (SMS) message or an Application Programming Interface (API) call from a satellite service provider. These messages or calls are received when a communication device, capable of functioning in both cellular and satellite modes and having the same Mobile Station International Subscriber Directory Number (MSISDN) in both modes, transitions to satellite mode. The reception of this special SMS message or API call signifies that the communication device is connecting to the satellite network.

Upon receipt of these signals, the satellite proxy network registers itself as a Visitor Location Register Mobile Switching Center (VMSC) with the communication device's Home Location Register (HLR). As the VMSC, the satellite proxy network is responsible for sending and receiving SMS messages related to the communication device while the device is in satellite mode. The satellite proxy network receives an SMS from the device in satellite mode and sends this message to a designated operator. The network also receives SMS messages from other devices or operators and sends these messages to the communication device in satellite mode via a satellite connection. This facilitates the exchange of messages between the satellite service provider and the other devices or operators while processing messaging services to and from the communication device.

The satellite proxy network also receives a deregister message from the communication device when it switches back to cellular mode, a signal that the device has shifted from the satellite network back to the cellular network. In response to this deregistration, the satellite proxy network updates the HLR, signifying this transition.

If a period of inactivity occurs between the communication device and the satellite proxy network—specifically, a period ranging from five to thirty minutes or longer—a purge Mobile Station (MS) is sent to the HLR. In return, the HLR sends a purge MS response to the satellite proxy network. The timeout values for a satellite phone when it's inactive can depend on a variety of factors, such as the specific satellite phone network used, the configuration of the network, the device settings, and even the satellite service provider's policies. In general, satellite networks are designed to maximize efficient use of the limited satellite bandwidth. This often involves disconnecting inactive devices after a certain period to free up resources for other devices. The exact timeout period can vary widely.

The HLR can also send a cancel registration to the satellite proxy network if it detects that the communication device has registered with another VMSC.

BRIEF DESCRIPTION OF THE DRAWINGS

For a fuller understanding of the invention, reference should be made to the following detailed disclosure, taken in connection with the accompanying drawings, in which:

FIG. 6 shows transaction detail record (TDR) processing for billing analytics.

FIG. 7 is a diagrammatic view of the process according to an embodiment of the invention.

DETAILED DESCRIPTION OF THE PREFERRED EMBODIMENT

Figure 1:
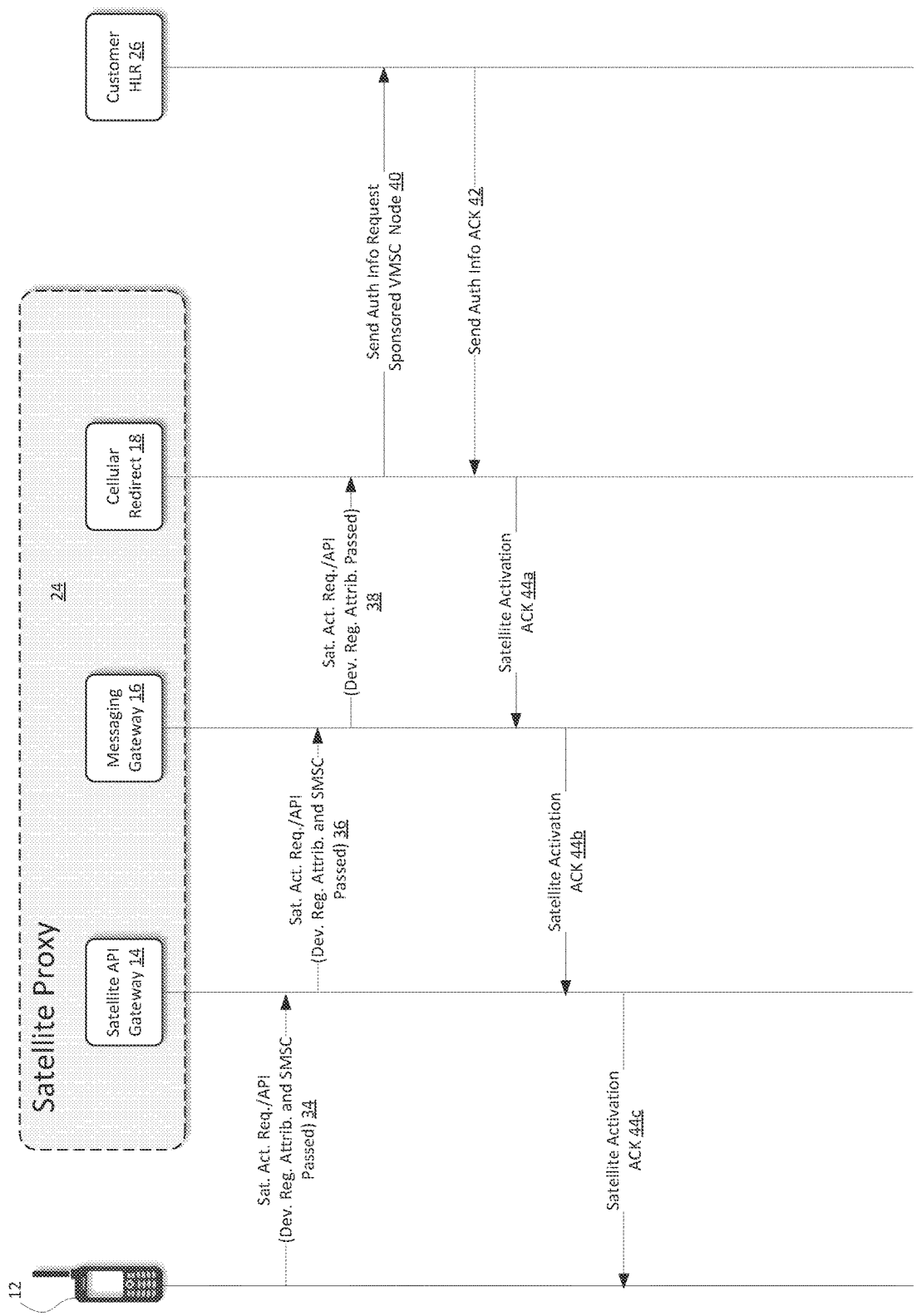
FIG. 1 shows an activation of satellite mode call flow to check if the device is registered on the operator network using the home operator HLR.

The invention provides a novel and non-obvious solution to the problem identified above. The solution for providing messaging services between cellular and satellite networks is by redirecting messages through an intermediary network. This is done by having a satellite service provider constantly monitor a device for its network mode (either cellular mode or satellite mode). The device will have the same MSISDN whether in cellular mode or satellite mode. When the device switches to satellite mode, a satellite service provider will send a special SMS to an intermediary network (for example, provided under the brand SYNIVERSE) indicating that the device is connecting to a satellite network. The intermediary network then registers the device with the cellular operator.

Once the device is registered with the intermediary network, the cellular operator processes messaging services to the device. From this point, the intermediary network is the anchoring point to send/receive device related SMS messages. The intermediary network receives SMS from the device and sends the SMS to the destination operator (MO from device). The intermediary network receives SMS from other devices/operators and sends to satellite device.

When the device switches back to cellular mode, the device registers directly with the servicing operator and sends a device deregister message to the intermediary network. The intermediary network then updates the back-end systems that the device moved from satellite network to cellular network.

Cellular Network Mobile Device Registration:

For cellular networks, mobile device registration typically involves the following steps: (a) when a mobile device is powered on or enters the coverage area of a cellular network, it starts searching for available networks and attempts to register with the one it's programmed to or permitted to access (based on the user's subscription plan); (b) the mobile device sends a registration request, including its International Mobile Equipment Identity (IMEI) number and International Mobile Subscriber Identity (IMSI) number, to the network; (c) the cellular network verifies the device's IMEI and checks the IMSI against its subscriber database and if the device and subscriber are valid, the network registers the mobile device and assigns it a temporary identifier, such as a Temporary Mobile Subscriber Identity (TMSI); and (d) the mobile device is now registered on the network and can access voice, text, and data services.

Satellite Network Mobile Device Registration:

For satellite networks, mobile device registration typically involves these steps: (a) when a mobile device is powered on and does not have cellular coverage, the subscribe must first request a connection to the satellite network by manually activating a button to establish a connection with the satellite network, usually by first locating then communicating with the nearest satellite in the network and once connected, the device transmits and receives any data required based on what is queued on either side; (b) the mobile device sends a registration request to the satellite, including its unique device identifier and subscriber information; (c) the satellite forwards the registration request to a ground-based Network Operations Center (NOC), where the device identifier and subscriber information are verified; (d) if the device and subscriber are valid, the NOC registers the mobile device in its database and sends an acknowledgment to the satellite, which in turn communicates the registration confirmation to the mobile device; and (e) the mobile device is now registered on the satellite network and can access text, and data services.

FIG. 1 shows a call flow diagram of an embodiment of the invention related to verifying if a satellite/cellular hybrid device 12 is part of a mobile operator network, in this case the customer home location register (HLR) 26. A collection of services form satellite proxy 24, those services include satellite API gateway 14, messaging gateway 16 and cellular redirect 18. Device 12 makes a satellite activation request 34 which may be instantiated by an API call to satellite API gateway 14. The API call data payload may include the attributes of device 12 along with the short message service center (SMSC) information. Satellite API gateway 14 then passes the satellite activation request to messaging gateway 16. Messaging gateway 16 then connects with cellular redirect 18 passing the satellite activation request 38. The cellular redirect 18 sends an authorization information request 40 conveying satellite proxy 24 as a Visitor Location Register (VLR) Mobile Switching Center (MSC) (VMSC) node to the customer HLR 26. HLR 26 returns back to cellular redirect 18 an authorization acknowledgement 42. Cellular redirect 18 then passes the satellite activation acknowledgement 44a-c through messaging gateway 16, satellite API gateway 14 ultimately back to device 12 respectively.

Figure 2:
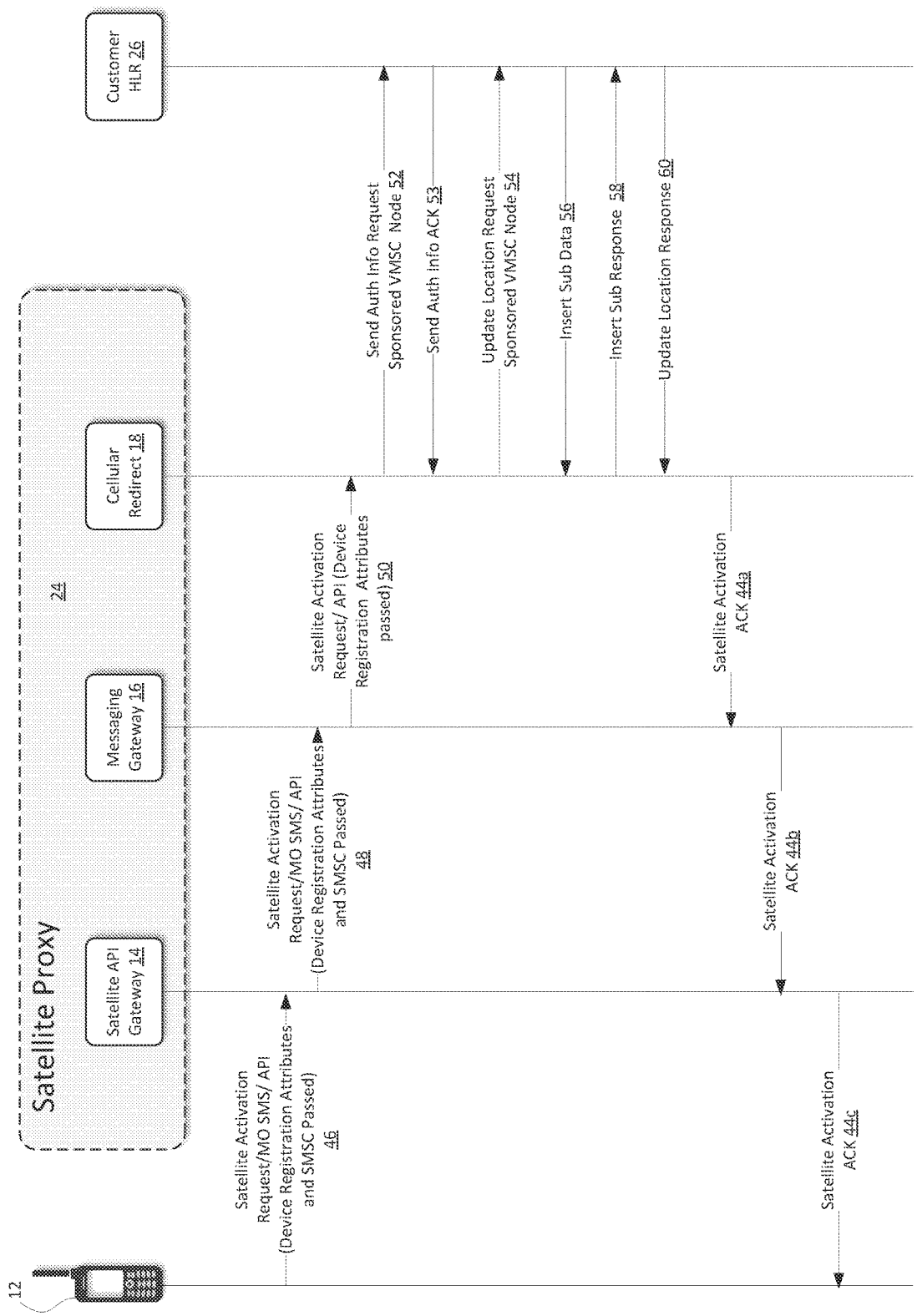
FIG. 2 shows an alternative embodiment of activation of satellite mode call flow where an update location procedure is set to the cellular redirect.

In FIG. 2, device 12 makes a satellite activation request 46 which may be instantiated by an API call to satellite API gateway 14 or a mobile operator (MO) SMS message. The data payload to the API gateway may include the attributes of device 12 along with the SMSC information. Satellite API gateway 14 then passes the satellite activation request 48 to messaging gateway 16. Messaging gateway 16 then connects with cellular redirect 18 passing the satellite activation request 50. The cellular redirect 18 sends an authorization information request 52 conveying satellite proxy 24 as a VMSC node to the customer HLR 26. HLR 26 returns back to cellular redirect 18 an authorization info acknowledgement 53. Cellular redirect 18 then sends an update location request as the sponsored VMSC node 54 to HLR 26. Subscriber data 56 is sent from HLR to cellular redirect 18 to which a response 58 is generated back to HLR 26. HLR 26 then sends update location response 60 effectively making satellite proxy network 24 a visiting location register to which device 12 is roaming on for messaging. Cellular redirect 18 sends satellite activation acknowledgement 44a-44c downstream through messaging gateway 16 and satellite API gateway 14 finally to device 12 respectively.

Figure 3:
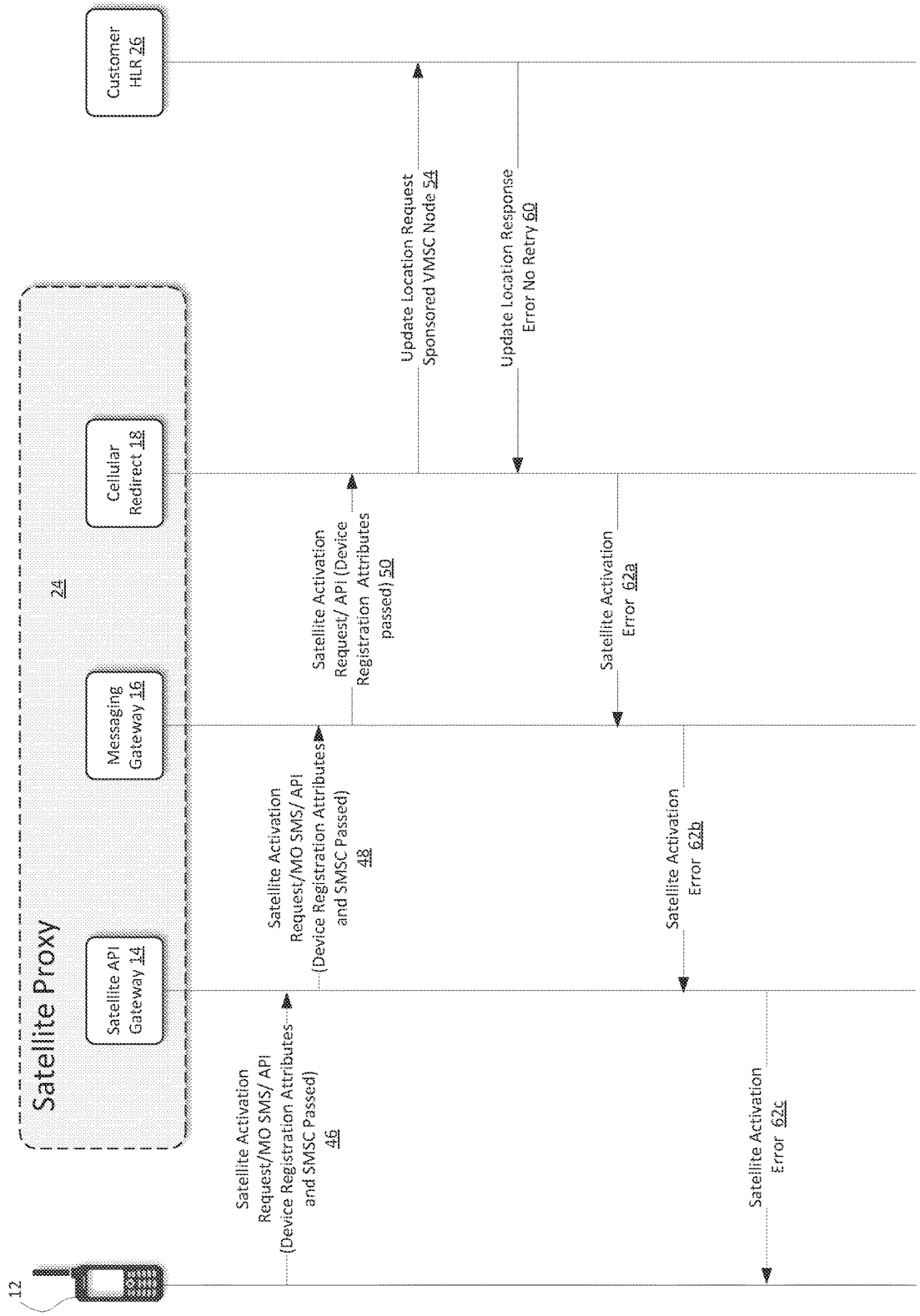
FIG. 3 shows an unsuccessful device satellite registration attempt error with no retry.
Figure 4:
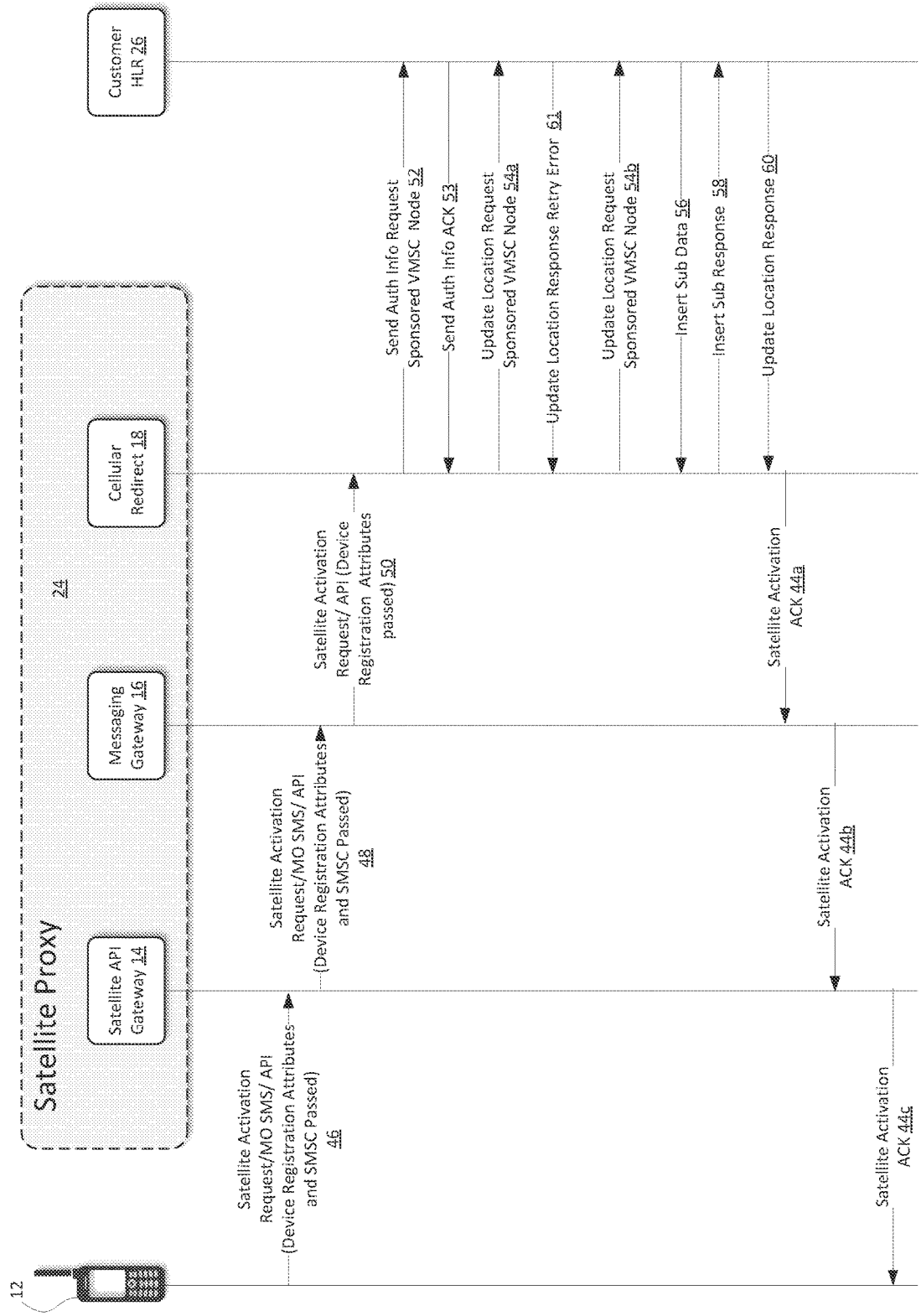
FIG. 4 shows a successful device satellite registration attempt with retry after an initial error.

FIG. 3 shows a call flow where the HLR 26 returns an error 60 without any retry attempts. This exception is passed down 62a-62c through cellular redirect 18, messaging gateway 16, satellite API gate 14 and finally to device 12 respectively. In FIG. 4, an exception error 61 responsive to update location response is sent to cellular redirect 18 from HLR 26 but in contrast with FIG. 3, a retry is attempted which successfully updates the location request 54b after the initial failed update location request 54a. The satellite activation takes its normal course wherein subscriber data 56 is sent from HLR to cellular redirect 18 to which a response 58 is generated back to HLR 26. HLR 26 then sends update location response 60 effectively making satellite proxy network 24 a visiting location register to which device 12 is roaming on for messaging. Cellular redirect 18 sends satellite activation acknowledgement 44a-44c downstream through messaging gateway 16 and satellite API gateway 14 finally to device 12 respectively.

Figure 5:
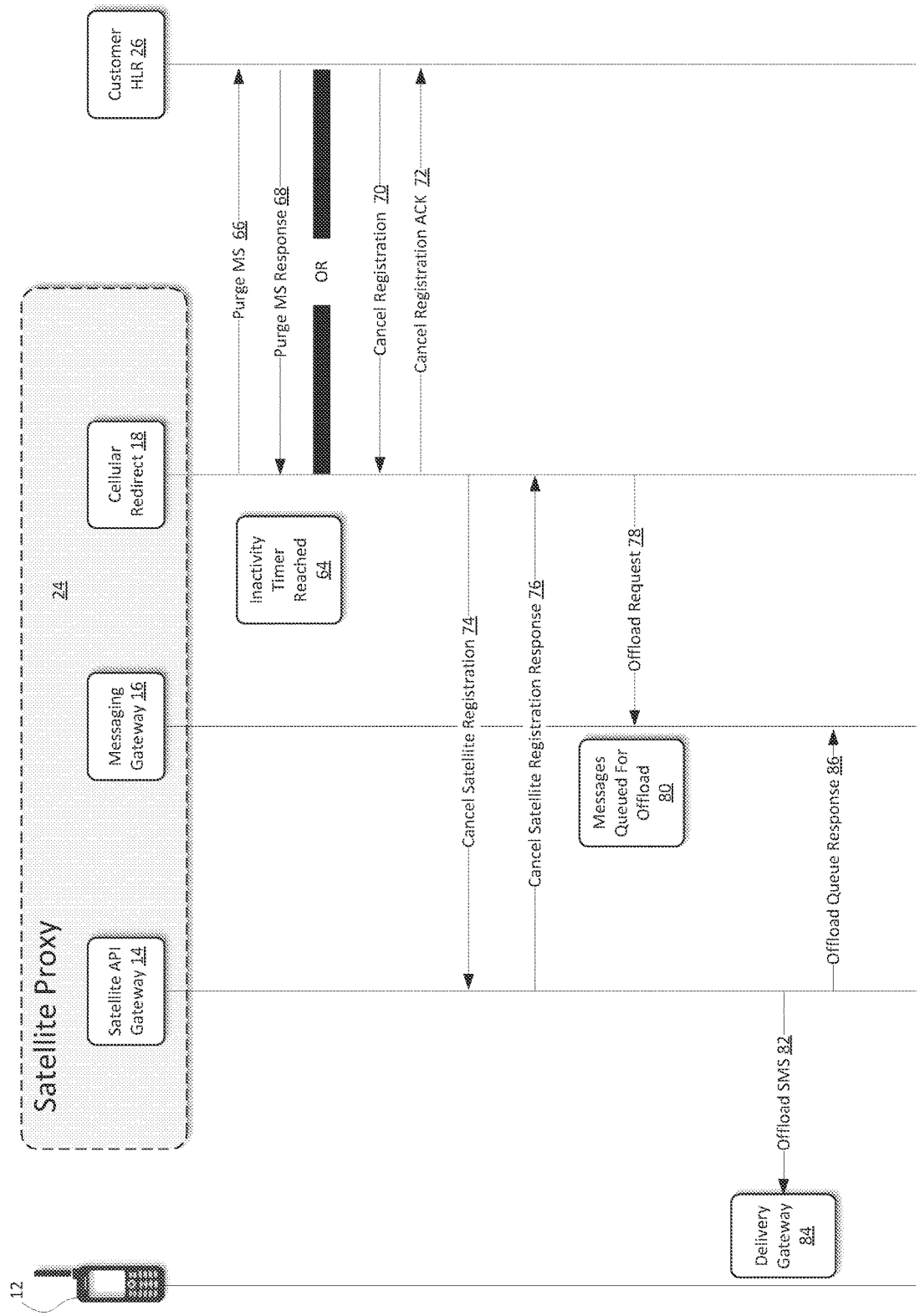
FIG. 5 shows a device satellite registration cancellation.

In FIG. 5, after a period of inactivity 64 satellite proxy network 24 may issue a purge mobile station (MS) 66 to HLR 26 to remove, or purge, the temporary data it has stored about a mobile station. When a device is not active, the network's Visitor Location Register (VLR), which in this case is emulated by the satellite proxy network 24, holds temporary information about the device, like its current location. If the device remains inactive long enough, the network will decide to purge, or remove, this data to save resources. When the mobile station becomes active again, the network will update the data.

Alternatively, device 12 may move onto another VLR or return back to the HLR 26 in which case HLR 26 will take the initiative issue a cancel registration 70 to cellular redirect 18 to which it would receive a cancel registration acknowledgement 72. In either case, cellular redirect 18 sends to satellite API gateway 14 a cancel satellite registration 74 to which it receives a response 76. Then, cellular redirect 18 issues offload request 78 to messaging gateway 16 wherein messages are queued for offload 80. Satellite API gateway 14 offloads SMS 82 to delivery gateway 84 and an offload queue response 86 is issued from satellite API gateway 14 to messaging gateway 16. FIG. 6 shows an embodiment of the invention managing TDR billing records 88 retrieving them from cellular redirect 18 and saving in database 20.

In FIG. 7, a hybrid satellite/cellular device 12 switches to satellite mode. Device 12 communicates with satellite 13 passing a satellite activation request 34 received by satellite API gateway 14. Satellite activation request 38 is sent from satellite API gateway 14 to cellular direct 18 which instantiates satellite registration 40 with customer HLR 26. Satellite API gateway 14 sends SMS MT (Mobile Terminated) message 36, which is a message meant for a mobile device, to messaging gateway 16. Messaging gateway 16 serves as an intermediary that manages the communication between various networks or systems. Messaging gateway 16 receives the SMS MT from the satellite API gateway 14 and then forwards 92 that message to customer SMSC (Short Message Service Center) 28. The SMSC 28 is responsible for storing, routing, and delivering SMS messages in the network. After receiving the SMS MT 92 from the messaging gateway 16, SMSC 28 then sends an SMS MO (Mobile Originated) message 94 initiated from the mobile device, to cellular redirect 18.

The described invention is a communication management system for a hybrid satellite/cellular device that operates within a mobile operator network. The central component of this system is a satellite proxy composed of several services, namely a satellite API gateway, a messaging gateway, and a cellular redirect. These elements work in concert to handle the device's transition between cellular and satellite networks. Activation requests, facilitated by API calls, are passed from the device to the satellite API gateway, then to the messaging gateway, and finally to the cellular redirect. The cellular redirect communicates with the Home Location Register (HLR) to authorize the satellite proxy as a Visitor Location Register (VLR) Mobile Switching Center (MSC) node. Exception errors and retry attempts are accommodated within the system. In cases of device inactivity, the system can purge temporary data about the mobile station to conserve resources, and update it when the device is active again. If the device switches to another VLR or returns to the HLR, the system can cancel the satellite registration. Lastly, the system handles transitioning the device to satellite mode, managing communications via SMS messages through the various network elements, and even orchestrates the management of TDR billing records.

REGISTRATION ERROR CODES MAPPING

Table 1 provides a list of error codes related to mobile device registration in a telecommunications network. Each error code corresponds to a specific issue or condition that prevents a device from being successfully registered. The table also indicates whether a registration notification error code should be sent to the messaging gateway (GW) and if a retry should be attempted for each particular error.

TABLE 1

Registration Error Codes Mapping

| Registration Error Codes | Registration Notification Error Codes To Messaging GW | Retry |
| --- | --- | --- |
| Roaming Not Allowed | REG001 | Z |
| Data Missing | REG002 | N |
| Unexpected Data Value | REG003 | N |
| Facility Not Supported | REG004 | N |
| Resource Limitation | REG005 | N |
| System Failure | REG006 | Y |
| Illegal Subscriber | REG007 | N |
| Illegal Equipment | REG008 | N |
| Unknown Subscriber | REG009 | Y |
| Bearer Service Not Provisioned | REG009 | N |
| TeleService Not Provisioned | REG010 | N |
| Timeout | REG011 | Y |

REST API

POST/API/SatelliteModeNotification/ This Representational State Transfer (REST) notification Application Programming Interface (API) is sent by the Messaging Gateway (GW) 28 to the SYNIVERSE API 30 when the device switches to satellite mode. The messages are in JavaScript Object Notation (JSON) format of Request:

TABLE 2

API Request

| Name | Located in | Description | Required | Schema |
| --- | --- | --- | --- | --- |
| IMSI | Body | IMSI | Yes | String |
| MSISDN | Body | MSISDN | Yes | String |
| OPID | Body | Operation Id | Yes | String |
| Authorization | Header | Unique ID identifying the company associated with the application | Yes | String |

Responses:

TABLE 3

API Response

| Code | Description | Schema |
| --- | --- | --- |
| 200 | Success | Response |
| 405 | REG001 - Roaming Not Allowed<br>REG002 - Data Missing<br>REG003 - Unexpected Data Value<br>REG004 - Facility Not Supported<br>REG005 - Resource Limitation<br>REG006 - System Failure<br>REG007 - Illegal Subscriber<br>REG009 - Bearer Service Not Provisioned<br>REG010 - Tele Service Not Provisioned<br>REG011 - Timeout | Error Response |
| 403 | Forbidden | |
| 404 | Not Found | |

Error Response:

TABLE 4
API Error Response

| Name | Type | Description | Required |
|---|---|---|---|
| error_code | String | Error Code | No |
| error_description | String | Description of Error | No |
| Retry Count | Integer | Retry Count | No |

POST/API/CancLocNotification/ This REST notification API is sent by the

Messaging GW 28 to Syniverse API 30 when the device switches to satellite mode. The messages are in JSON Format.

Request:

TABLE 5
Cellular Registration Request

| Name | Located in | Description | Required | Schema |
|---|---|---|---|---|
| IMSI | Body | IMSI | Yes | String |
| OPID | Body | Operation Identification | Yes | String |
| Authorization | Header | Unique ID identifying the company associated with the application | Yes | String |

Responses:

TABLE 6
Cellular Registration Response

| Code | Description | Schema |
|---|---|---|
| 200 | Success | Response |
| 401 | Unauthorized | |
| 403 | Forbidden | |
| 404 | Not Found | |

DATABASE DESIGN

The following tables enable an embodiment of this solution. MCC_MNC_list—This table lists MCC and MNC for carrier id. MCC stands for Mobile Country Code in the context of mobile device telecommunications. It is a three-digit numeric code that uniquely identifies a specific country or region where a mobile network operates. MCC is used in combination with the Mobile Network Code (MNC), which is a two or three-digit numeric code that identifies a particular mobile network operator within a country.

TABLE 7
MCC and MNC for Carrier ID

| Fields | Data Type |
|---|---|
| Carrier id | Integer |
| Mcc | String |
| Mnc | String |
| Timestamp | Long |

Carrier Table—This table contains carrier name and country code for each carrier id.

TABLE 8
Carrier Table

| Fields | Data Type |
|---|---|
| Carrier_id | Integer |
| CarrierName | String |
| CountryCode | String |
| Timestamp | Long |

IMSI_RANGE_MAP—This table contains the IMSI mapping to the HLR.

TABLE 9
IMSI Range Map

| Fields | Data Type |
|---|---|
| Imsi_max | Long |
| Imsi_min | Long |
| Hlr_number | String |

Registration_Info—This table contains the IMSI mapping to the origination MME host and HLR number.

TABLE 10
Registration Information

| Fields | Data Type |
|---|---|
| Imsi | Long |
| Timestamp | Long |
| Hlr_number | String |
| VlrNumber | String |
| MessageType | Enum |

SAMPLE JSON FILE FORMAT

```
title: SatModeNotification
host: 'localhost:54990'
basePath: /
tags:
  - name: Notification
    description: Sends Notification
paths:
  /Notification/SatModeNotification:
    post:
      tags:
        - Notification v1
      summary: SendNotification
      operationId: SendNotificationUsingPOST
      consumes:
          - application/json
      produces:
          - application/json
      parameters:
          -in: body
             name: imsi
             description: imsi
             required: true
                type: string
          - in: body
             name: msisdn
             description: msisdn
             required: true
                type: string
          - in: body
             name: opid
             description: operationid
```

SAMPLE JSON FILE FORMAT

```
              required: true
                type: string
          - name: int-companyId
            in: header
            description: Unique ID identifying the company
  associated with the application.
              required: true
                type: string
        response
          '200':
              description: success
          '400'
              Error Response
  CanLocSampleFile
  title: CanLocNotification
  host: 'localhost:54990'
  basePath: /
  tags:
    - name: Notification
      description: Sends Notification
  paths:
    /Notification/CanLocNotification:
      post:
        tags:
          - Notification v1
        summary: CanLocNotification
        operationId: CanLocNotificationUsingPOST
        consumes:
          - application/json
        produces:
          - application/ json
        parameters:
          - in: body
            name: imsi
            description: imsi
            required: true
            type: string
          - in: body
            name: opid
            description: operationid
            required: true
            type: string
          - name: int-companyId
            in: header
            description: Unique ID identifying the company
  associated with the application.
              required: true
                type: string
        response
          '200':
              description: success
```

TDR—TRANSACTION DETAILS & ANALYTICS

The transaction details are sent to the TDR process 64 by Cell Redirect Server 32. The Billing and Analytics components are integrated to receive the TDR data for billing purposes as needed.

Referring to FIG. 6, the Cell Redirect Server 32 sends GRPC Message for each event (UpdateLocReq 34, UpdateLocationRsp 35, CancelLocReq 55, CancelLocRsp 56) to the TDR Process 64. TdrProcess 64 logs the information periodically for debug/research. These event details from TDR 64 can be read by billing and analytics portal 66 for billing purposes if needed.

TABLE 11

TDR Fields Table

| S. No | TDR Field Name | Type | Default Value | Description |
|---|---|---|---|---|
| 1 | Imsi | String | NULL | IMSI value |
| 2 | Msisdn | String | NULL | MSISDN value |
| 3 | Transaction Id | Int 32 | 0 | TransactionId |
| 4 | Home Carrier Id | Int 32 | 0 | Home Carrier |
| 5 | Visited Carrier Id | Int 32 | 0 | Visited Carrier |
| 6 | Vlr Number | String | NULL | VlrNumber |
| 7 | MSC Number | String | NULL | Msc Number |
| 8 | Operation Id | String | NULL | Operation Id |
| 9 | Request Type | Enum | NULL | 1. UpdateLocReq 2. CancelLocReq 3. UpdateLocationRsp 4. CancelLocRsp |
| 10 | TimeStamp | String | NULL | Timestamp of the event |

FIG. 7 shows hybrid satellite device 12 having a selector 74 to switch between satellite mode 75 and cellular mode 76. The hybrid satellite device 12 has the same MISIDN while in either satellite mode 75 or cellular mode 76. When switched to satellite mode 75, satellite service provider 72 sends a zero-byte SMS received by queue 14 which is then received by gateway 16. Gateway sends the unique 15-digit IMEI derived from the zero-byte SMS to ENUM system 18. ENUM (short for E.164 NUmber Mapping) is a protocol used in telecommunications to map E.164 telephone numbers to other resources on the Internet. E.164 is an ITU-T recommendation defining the international public telecommunication numbering plan used in the PSTN (Public Switched Telephone Network) and some other data networks. ENUM system 18 returns the IMSI, MSISDN and OP ID back to gateway 16. Gateway 16 then sends a JSON payload to API 30 which includes the IMSI, MSISDN and OP ID received from ENUM system 18. API 30 and cell redirect 32 comprise intermediary network 71 which registers on the device 12 HLR 22 to receive inbound SMS 30 messages and then pass them through intermediary network 71 back to satellite service provide 72 via satellite connection 77. In this manner, hybrid device 12 can switch seamlessly between sat mode 75 and cell mode 76 while still receiving SMS messages forwarded through intermediary network 71.

HARDWARE AND SOFTWARE INFRASTRUCTURE EXAMPLES

The various techniques described herein can be implemented in connection with hardware or software or, where appropriate, with a combination of both. Thus, the methods and system described herein, or certain aspects or portions thereof, can take the form of program code (i.e., instructions) embodied in tangible media, such as hard drives, solid state drives, or any other machine-readable storage medium, wherein, when the program code is loaded into and executed by a machine, such as a computing device, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The invention can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the invention. Additionally, any storage techniques used in connection with the invention can be a combination of hardware and software.

GLOSSARY OF TERMS

API, or Application Programming Interface, is a set of rules and protocols that enable different software systems to communicate with each other. It defines methods and data formats that a program can use to perform tasks like request services or retrieve data from another software application.

Cancel Location Request (CancelLocReq) means a message or procedure used in mobile networks, particularly in the context of location-based services or roaming scenarios. A CancelLocReq is typically sent by the HLR to the VLR when it determines that the mobile device is no longer present in the visited network or when the HLR wants to cancel the location information previously provided to the VLR. This could happen in various scenarios, such as when the mobile device moves back to its home network, switches to another visited network, or when the device is deactivated or deregistered. Upon receiving a CancelLocReq, the VLR updates its records and removes the location information for the specified mobile device. This helps maintain accurate and up-to-date location information for roaming devices and reduces unnecessary resource usage in the network.

Cancel Location Response (CancelLocRsp) means a procedure is used by a Home Location Register (HLR) to inform a Visited Location Register (VLR) or a Serving GPRS Support Node (SGSN) that it should remove the subscriber's location information from its database. This procedure is typically initiated when a subscriber's service has been terminated, or when the subscriber has been transferred to a different VLR or SGSN. The Cancel Location Response (CancelLocRsp) is a message sent by the VLR or SGSN back to the HLR, acknowledging the receipt and successful processing of the Cancel Location request. This response confirms that the subscriber's location information has been removed from the VLR or SGSN as requested.

Cellular Network means a communication network that uses radio frequency (RF) signals to provide wireless connectivity to mobile devices such as smartphones, tablets, and laptops. The network is designed with a grid of interconnected cells, each of which is served by a base station, also known as a cell site or cell tower. These cells work together to create coverage areas that enable users to make phone calls, send text messages, and access the internet on their devices. The term "cellular" comes from the way these networks divide geographical areas into smaller hexagonal or square-shaped regions called cells. Each cell has a base station that communicates with mobile devices within its coverage area. As a user moves from one cell to another, the network automatically transfers the user's active connection from one base station to the next, ensuring seamless communication.

Domain Name System (DNS) is used to map readable character strings (e.g., Syniverse.com) to numerical Internet Protocol addresses needed to locate services and devices.

HLR means Home Location Register which is a database that contains subscription data about subscribers authorized to use the GSM core network. The HLRs store details of every SIM card issued by the mobile phone operator.

IMEI means International Mobile Equipment Identity. It is a specification that is used to identify devices across mobile networks. It is a unique 15-digit number assigned to each mobile device, such as a mobile phone or a cellular-enabled tablet.

IMSI means International Mobile Subscriber Identity. It is a specification used to uniquely identify a subscriber to a mobile telephone service. It is used internally to a GSM network and is adopted on nearly all cellular networks. The IMSI is a 50-bit field which identifies the phone's home country and carrier and is usually fifteen digits. This 15-digit number has two parts. The first part is comprised of six digits in the North American standard and five digits in the European standard. It identifies the GSM network operator in a specific country where the subscriber holds an account. The second part is allocated by the network operator to uniquely identify the subscriber. For GSM, UMTS and LTE network, this number is provisioned in the SIM card and for CDMA2000 in the phone directly or in the R-UIM card (the CDMA2000 analogue to a SIM card for GSM).

Messaging Gateway (Messaging GW) handles messaging communication between satellite and cellular networks.

MMS (Multimedia Messaging Service) is an extension of the core SMS (Short Message Service) protocol, and it was developed to enable the transmission of multimedia content via text message. MMS messages can include text, pictures, audio, and video, making it possible for mobile users to send and receive more dynamic content than with standard SMS.

Mobile Device Registration means the process of associating a mobile device with a specific network, whether it's a cellular or satellite network, to enable communication services. This registration allows the network to recognize, authenticate, and manage the mobile device, granting it access to voice, text, and data services.

Mobile Switching Center (MSC) means the primary service delivery node for GSM/CDMA, responsible for routing voice calls and SMS as well as other services. The MSC connects and releases end-to-end connections, administers mobility and hand-over requirements during the call and oversees charging and real-time prepaid account monitoring.

MSISDN means Mobile Station International Subscriber Directory Number which is provisioned to a mobile device subscriber for making calls. It is the mapping of the telephone number to the SIM card (or CDMA2000 directly in the hardware) in a mobile or cellular phone and is the number normally dialed to connect a call to the mobile device. A SIM card has a unique IMSI that does not change but the MSIDN can change in time (e.g., telephone number portability).

OP ID means Operation Identification.

RCS (Rich Communication Services) is a communication protocol that aims to replace SMS and provide a richer and more interactive experience to the standard messaging on devices. RCS supports high-resolution photo sharing, group messaging, read receipts, typing indicators, and more. It's often viewed as the evolution of SMS and MMS, providing a more engaging and interactive form of text-based communication.

Satellite Network means a communication system that uses artificial satellites orbiting the Earth to provide wireless connectivity for voice, data, and multimedia services. Satellite networks enable communication between widely dispersed locations or in areas where terrestrial infrastructure, such as cellular networks or wired connections, is limited or unavailable. In a satellite network, signals are transmitted from a ground-based transmitter (known as an earth station or ground station) to a satellite in space. The satellite receives the signal, amplifies it, and then retransmits it back to Earth, where it is received by another ground station or a user's satellite dish. This communication process is often referred to as an uplink (from Earth to the satellite) and a downlink (from the satellite back to Earth).

Satellite Proxy Network means an intermediary server or collection of servers that sit between and communicate with two disparate network systems (e.g., satellite and cellular) forwarding requests and responses back and forth. With respect to this invention, the satellite proxy network acts as an intermediary for managing SMS messages but could include other types of messaging protocols including, but not limited to, MMS, RCS and the like. The satellite proxy network receives incoming messages on the cellular network, and forwards them to the destination satellite phone using its connection. Conversely, the satellite proxy network also receives messages from the satellite service and forwards them to the intended recipient on the cellular network. In both cases, the satellite proxy network is managing and rerouting the communications.

SMS means Short Message Service. It is a telecommunications service that allows users to send and receive text messages containing up to 160 characters (or 70 characters for languages that use non-Latin alphabets like Chinese, Arabic, etc.). SMS is a widely used feature of mobile phones and is supported by most wireless networks and devices. SMS messages are transmitted through a store-and-forward system using cellular networks. When an SMS is sent, it is stored in a Short Message Service Center (SMSC) before being forwarded to the recipient's mobile device. If the recipient's device is unavailable or out of range, the SMSC will store the message and attempt to deliver it later.

Update Location Request (UpdateLocationReq) means a message or procedure used in mobile networks, specifically in the context of GSM (Global System for Mobile Communications) and UMTS (Universal Mobile Telecommunications System) networks. This message is part of the Location Update procedure, which is essential for keeping track of subscribers' locations as they move around within the network or roam to other networks. The UpdateLocationReq is typically sent from the Mobile Switching Center/Visitor Location Register (MSC/VLR) to the Home Location Register (HLR) when a mobile device performs a location update. This can happen under various circumstances, such as: (a) When a mobile device enters a new Location Area (LA) and needs to inform the network of its new location; (b) when a mobile device is turned on or re-enters the network coverage area after being out of range; and (c) when a periodic location update is required by the network to maintain an up-to-date record of the subscriber's location. The purpose of the UpdateLocationReq message is to request the HLR to update its records with the new location information of the subscriber. The HLR responds with an UpdateLocationAck (Update Location Acknowledgment) message, indicating whether the request has been successful or not. In addition to location updates, this procedure can also be used for other purposes, such as authentication, to ensure that the mobile device is a valid subscriber and not an unauthorized device trying to gain access to the network.

Update Location Response (UpdateLocationRsp) means the message returned by the HLR responsive to and Update Location Request. The UpdateLocationRsp confirms that the HLR has successfully updated the location information for the mobile subscriber. Once the new MSC receives the UpdateLocationRsp, it knows that the subscriber's location information is accurate and up-to-date, and it can provide seamless mobile services to the subscriber within the new location area.

Visitor Location Register (VLR) means a database storing data about mobile phones that recently joined a particular area of a mobile operator's network. The VLR keeps track of roamed mobile phone subscribers and communications with the HLR to determine whether the mobile phone is a permanent or temporary subscriber.

VMSC, or Visitor Location Register Mobile Switching Center, is a critical component of a mobile network's infrastructure that manages the operations of mobile devices roaming within its area of coverage. A Mobile Switching Center (MSC) is the primary service delivery node for GSM (Global System for Mobile Communications), responsible for toll ticketing, network interfacing, common channel signaling, and others. When a mobile device is roaming (i.e., is operating outside its home network), it is served by what's known as a Visitor Location Register Mobile Switching Center (VMSC). The VMSC is responsible for a number of functions: (a) it checks the visiting mobile device's right to access the network and its services; (b) it routes calls to mobile devices within its jurisdiction; and (c) it manages mobile device location updates to ensure that the network knows where to route calls. In the context of this invention, the satellite proxy network registers as a VMSC with the Home Location Register (HLR) of a mobile device. This allows the proxy network to manage the sending and receiving of messages related to the mobile device when it is operating in satellite mode.

The advantages set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense. This invention enables cellular redirection service for messaging originating from non-cellular platforms (e.g., satellite services).

What is claimed is:

1. A method performed by a satellite proxy network for providing messaging services between cellular and satellite networks, comprising:

receiving a special Short Message Service (SMS) message or an application programming interface (API) call from a satellite service provider when a communication device capable of operating in both cellular mode and satellite mode, having the same Mobile Station International Subscriber Directory Number (MSISDN) in both modes, switches to satellite mode, wherein the special SMS message or API call indicates that the communication device is connecting to a satellite network;

the satellite proxy network registering as a visitor location register mobile switching center (VMSC) with a home location register (HLR) of the communication device upon receiving the special SMS message or API call from the satellite service provider;

the satellite proxy network serving as the VMSC for sending and receiving SMS messages related to the communication device when the device is in satellite mode;

the satellite proxy network receiving an SMS from the communication device in satellite mode and sending the SMS ultimately to a destination operator; and the satellite proxy network receiving an SMS from other devices or operators and redirecting the SMS by a satellite connection to the communication device in satellite mode, thereby facilitating message exchange between the satellite service provider and the other device or operators and processing messaging services to and from the communication device.

2. The method of claim 1, wherein the communication device sends a deregister message to the satellite proxy network when switching back to cellular mode.

3. The method of claim 2, wherein the deregister message indicates that the communication device has moved from the satellite network to the cellular network.

4. The method of claim 2, wherein the satellite proxy network updates the HLR upon receiving the deregister message from the communication device, indicating the transition from satellite network to cellular network.

5. The method of claim 4 further comprising the satellite proxy network sending a purge mobile station (MS) to the HLR and the HLR returns a purge MS response to the satellite proxy network.

6. The method of claim 5 wherein the purge MS is sent to the HLR responsive to a timeout function representative of a period of inactivity between the communication device and the satellite proxy network.

7. The method of claim 5 wherein the period of inactivity is between five and thirty minutes.

8. The method of claim 1, wherein the HLR sends a cancel registration to the satellite proxy network responsive to the HLR detecting the communication device has registered with another VMSC.

9. A system implemented by a satellite proxy network for providing messaging services between cellular and satellite networks, the system comprises:

a communication interface configured to receive a specialized Short Message Service (SMS) message or an Application Programming Interface (API) call from a satellite service provider when a communication device, operable in both cellular and satellite modes and having the same Mobile Station International Subscriber Directory Number (MSISDN) in both modes, switches to satellite mode, the special SMS message or API call indicating that the communication device is connecting to the satellite network;

a registration component operatively coupled to the communication interface, the registration component configured to register the satellite proxy network as a Visitor Location Register Mobile Switching Center (VMSC) with a Home Location Register (HLR) of the communication device upon receipt of the special SMS message or API call;

a messaging component configured to serve as the VMSC for sending and receiving SMS messages related to the communication device when the device is in satellite mode;

a component configured to receive an SMS from the communication device in satellite mode and send the SMS to a destination operator; and a delivery component configured to receive an SMS from other devices or operators and send the SMS via a satellite connection to the communication device in satellite mode, facilitating message exchange between the satellite service provider and the other devices or operators and processing messaging services to and from the communication device.

10. The system of claim 9, further comprising a notification component configured to receive a deregister message from the communication device when it switches back to cellular mode.

11. The system of claim 10, wherein the deregister message indicates that the communication device has moved from the satellite network to the cellular network.

12. The system of claim 10, further comprising an update component configured to update the Home Location Register (HLR) upon receipt of the deregister message from the communication device, signifying the transition from satellite network to cellular network.

13. The system of claim 12, wherein the update component is further configured to send a purge Mobile Station (MS) to the HLR, and wherein the HLR is configured to return a purge MS response to the satellite proxy network.

14. The system of claim 13, wherein the purge MS is triggered by a timeout function indicative of a period of inactivity between the communication device and the satellite proxy network.

15. The system of claim 14, wherein the period of inactivity ranges between five and thirty minutes.

16. The system of claim 12, wherein the HLR is further configured to send a cancel registration to the satellite proxy network in response to detecting that the communication device has registered with another Visitor Location Register Mobile Switching Center (VMSC).

17. A method performed by a satellite proxy network for providing messaging services between cellular and satellite networks, the method comprising:

receiving a special Short Message Service (SMS) message or an Application Programming Interface (API) call from a satellite service provider when a communication device capable of operating in both cellular mode and satellite mode, having the same Mobile Station International Subscriber Directory Number (MSISDN) in both modes, switches to satellite mode, wherein the special SMS message or API call indicates that the communication device is connecting to the satellite network;

registering as a Visitor Location Register Mobile Switching Center (VMSC) with a Home Location Register (HLR) of the communication device upon receiving the special SMS message or API call from the satellite service provider;

serving as the VMSC for sending and receiving SMS messages related to the communication device when the device is in satellite mode;

receiving an SMS from the communication device in satellite mode and sending the SMS to a destination operator;

receiving an SMS from other devices or operators and sending the SMS by a satellite connection to the communication device in satellite mode, thereby facilitating message exchange between the satellite service provider and the other device or operators and processing messaging services to and from the communication device;

receiving a deregister message from the communication device when it switches back to cellular mode, wherein the deregister message indicates that the communication device has moved from the satellite network to the cellular network; and updating the HLR upon receiving the deregister message from the communication device, indicating the transition from satellite network to cellular network.

18. The method of claim 17 further comprising the step of sending a purge Mobile Station (MS) to the HLR responsive to a timeout function representative of a period of inactivity between the communication device and the satellite proxy network.

19. The method of claim 18 wherein the period of inactivity is between five and thirty minutes.

20. The method of claim 17 further comprising the step of receiving by the satellite proxy network a cancel registration from the HLR in response to the HLR detecting that the communication device has registered with another VMSC.

* * * * *